US012258925B2

(12) United States Patent
Boileau et al.

(10) Patent No.: US 12,258,925 B2
(45) Date of Patent: Mar. 25, 2025

(54) THRUST REVERSER COMPRISING PIVOTING HALF-ASSEMBLIES AND A CONNECTING BEAM FOR THE HALF-ASSEMBLIES AT THE SIX O'CLOCK POSITION

(71) Applicant: SAFRAN NACELLES, Gonfreville-l'Orcher (FR)

(72) Inventors: Patrick André Boileau, Moissy-Cramayel (FR); Julien Chandelier, Moissy-Cramayel (FR); Laurent Georges Valleroy, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/005,871

(22) PCT Filed: Jul. 8, 2021

(86) PCT No.: PCT/FR2021/051263
§ 371 (c)(1),
(2) Date: Jan. 18, 2023

(87) PCT Pub. No.: WO2022/018345
PCT Pub. Date: Jan. 27, 2022

(65) Prior Publication Data
US 2023/0313755 A1  Oct. 5, 2023

(30) Foreign Application Priority Data
Jul. 20, 2020 (FR) ...................................... 2007579

(51) Int. Cl.
*F02K 1/72* (2006.01)
*B64D 29/06* (2006.01)
(Continued)

(52) U.S. Cl.
CPC ................ *F02K 1/72* (2013.01); *B64D 29/06* (2013.01); *B64D 29/08* (2013.01); *F02K 3/06* (2013.01)

(58) Field of Classification Search
CPC ........... B64D 29/06; B64D 29/08; F02K 1/70; F02K 1/72
See application file for complete search history.

(56) References Cited

U.S. PATENT DOCUMENTS

| 4,541,673 A | 9/1985 | Greiert |
| 2018/0156131 A1* | 6/2018 | Olson ...................... B64C 7/02 |

(Continued)

FOREIGN PATENT DOCUMENTS

| EP | 2631181 A2 | 8/2013 |
| FR | 3074853 A1 | 6/2019 |
| WO | 2013038093 A1 | 3/2013 |

OTHER PUBLICATIONS

International Search Report for Application No. PCT/FR2021/051263 dated Oct. 25, 2021.
Written Opinion for PCT/FR2021/051263 dated Oct. 25, 2021.

*Primary Examiner* — Andrew H Nguyen
(74) *Attorney, Agent, or Firm* — McDonald Hopkins LLC (57) ABSTRACT

A thrust reverser for a propulsion unit, incudes movable grids, two half-assemblies forming part of a secondary stream and, at the six o'clock position, a connecting beam intended to be mounted in cantilever with a fan housing. The half-assemblies are hinged at the twelve o'clock position so as to enable their "butterfly" movement between a flight configuration and a maintenance configuration. The connecting beam includes a connecting member configured to cooperate, in the form of a tenon and groove connection, with the half-assemblies when these are in flight configura- (Continued)

tion. The reverser also includes, downstream of the connecting member, locks capable of locking the half-assemblies in flight configuration.

9 Claims, 8 Drawing Sheets

(51) Int. Cl.
*B64D 29/08* (2006.01)
*F02K 3/06* (2006.01)

(56) References Cited

U.S. PATENT DOCUMENTS

| | | |
|---|---|---|
| 2019/0055902 A1 | 2/2019 | Stone et al. |
| 2020/0309065 A1* | 10/2020 | Boileau .................. B64D 29/08 |

\* cited by examiner

THRUST REVERSER COMPRISING PIVOTING HALF-ASSEMBLIES AND A CONNECTING BEAM FOR THE HALF-ASSEMBLIES AT THE SIX O'CLOCK POSITION

This is the National Stage of PCT international application PCT/FR2021/051263, filed on Jul. 8, 2021 entitled "THRUST REVERSER COMPRISING PIVOTING HALF-ASSEMBLIES AND A CONNECTING BEAM FOR THE HALF-ASSEMBLIES AT THE SIX O'CLOCK POSITION", which claims the priority of French Patent Application No. 2007579 filed Jul. 20, 2020, both of which are incorporated herein by reference in their entireties.

TECHNICAL FIELD

The invention relates to the field of thrust reversers for aircraft propulsion units and more specifically to thrust reversers having a "D"-like structure such as that described in the document FR 3 074 853 A1.

The invention is particularly interesting when the thrust reverser includes movable cascades.

STATE OF THE PRIOR ART

In a manner known per se, a thrust reverser with a D-like structure comprises two half-assemblies hinged on beams which extend on either side of a mast of the propulsion unit, so as to be able to open or close these half-assemblies, i.e. to make them switch from a flight configuration to a maintenance configuration or vice versa.

The document FR 3 074 853 A1 discloses a thrust reverser of this type which further comprises an assembly box carrying a device for locking the half-assemblies in the flight configuration.

During opening/closure of the half-assemblies, each of the half-assemblies is placed bearing on a respective surface of the assembly box then locked in this position, independently of the other half-assembly, using said locking device. Afterwards, the half-assemblies are connected to each other using locks.

Hence, each of the half-assemblies is locked on the one hand with the assembly box and on the other hand with the other half-assembly, resulting in a hyperstatic assembly.

In addition, the locking device described in the aforementioned document complicates the procedure for locking the half-assemblies and is not very robust.

DISCLOSURE OF THE INVENTION

The invention aims to provide a thrust reverser with cascades allowing simplifying and improving the positioning and locking of the half-assemblies in the flight configuration.

The invention also aims to provide a thrust reverser having an architecture which enables a movement of the cascades when the thrust reverser switches from a direct thrust configuration to a reverse thrust configuration.

To this end, an object of the invention is a thrust reverser for an aircraft propulsion unit, comprising two half-assemblies, a connecting beam and cascades, each of the half-assemblies comprising a movable cowl and a fixed structure including a first connecting element and a second connecting element, the connecting beam comprising a connecting member. For each of the half-assemblies:

the first connecting element is configured to hinge the half-assembly on a fixed portion of the propulsion unit so as to be able to move the half-assembly between a flight configuration in which the second connecting element cooperates with the connecting member and a maintenance configuration in which the second connecting element is detached off the connecting member, in the flight configuration, the movable cowl is movable relative to the fixed structure in translation along a longitudinal central axis between a direct thrust position, in which the fixed structure and the movable cowl delimit radially therebetween a respective portion of a duct in order to channel a fluid flow towards the rear of the propulsion unit to generate thrust, and a reverse thrust position, in which the movable cowl uncovers a space receiving the cascades so that a portion of the fluid flowing in the duct could pass through the cascades while being diverted thereby so as to generate counter-thrust.

According to the invention, amongst the connecting member and the second connecting element of each of the half-assemblies, one comprises a groove and the other one comprises a tenon configured to fit into the groove when the half-assemblies are moved from the maintenance configuration up to the flight configuration so as to position each of the half-assemblies in the flight configuration, the thrust reverser comprising one or more lock(s) configured to connect together and to lock the half-assemblies in the flight configuration.

Such a groove and such a tenon allow achieving an embedding that is both accurate and robust while ensuring a compact connection which reduces the bulk of the assembly in the flight configuration.

In addition, such an embedding does not require locking each of the half-assemblies independently on the connecting beam, which simplifies the locking procedure and allows using only conventional locks.

The architecture of this thrust reverser is compatible with the use of movable cascades, which can for example be connected to the connecting beam according to a sliding connection.

The connecting beam allows transmitting forces from the half-assemblies to a fixed portion of the propulsion unit on which the connecting beam can be fastened.

Moreover, such an architecture allows providing for passages for auxiliaries.

In one embodiment, the second connecting element of each of the half-assemblies forms a half-cavity enveloping a respective half-portion of the connecting member when the half-assemblies are in the flight configuration.

In one embodiment, the connecting beam extends along an axis around which the groove extends.

According to a first variant, the groove is formed by the connecting member and each of the second connecting elements of the half-assemblies comprises a respective tenon configured to be received in a respective portion of the groove when the half-assemblies are in the flight configuration.

According to a second variant, the connecting member forms said tenon and each of the second connecting elements of the half-assemblies comprises a respective groove configured to receive a respective portion of the tenon when the half-assemblies are in the flight configuration.

These variants can be combined. For example, the connecting member may comprise a first groove and a first tenon and each of the second connecting elements of the half-assemblies may comprise on the one hand a second tenon configured to be received in a respective portion of the first groove when the half-assemblies are in the flight configuration and, on the other hand, a second groove configured to receive a respective portion of the first tenon when the half-assemblies are in the flight configuration.

In one embodiment, one of said locks is an inner lock and another one of said locks is an outer lock.

Preferably, the inner lock may be connected to the fixed structure of one of the half-assemblies and be configured to cooperate with a first hooking element secured to the fixed structure of the other half-assembly, the hooking element extending radially between the longitudinal central axis and an axis along which the connecting beam extends.

Preferably, the outer lock may be connected to the fixed structure of one of the half-assemblies and be configured to cooperate with a second hooking element secured to the fixed structure of the other half-assembly, the axis along which the connecting beam extends extending radially between the second hooking element and the longitudinal central axis.

In one embodiment, the connecting beam comprises first rails and the fixed structure of each of the half-assemblies comprises a second rail, the cascades being movable between a first position and a second position and being configured to cooperate with the first rails at least over a first portion of a movement between the first and second positions and to cooperate with the second rails at least over a second portion of this movement.

Preferably, the first connecting element of each of the half-assemblies is located on one side of a longitudinal midplane passing through the longitudinal central axis and in which the connecting beam is located on the other side of this longitudinal midplane.

The invention also relates to a nacelle for an aircraft propulsion unit, comprising a thrust reverser as defined hereinabove.

The invention also relates to a propulsion unit for an aircraft, comprising such a nacelle.

In one embodiment, the propulsion unit comprises a fan casing, the connecting beam extending axially cantilevered with respect to the fan casing.

Finally, an object of the invention is an aircraft comprising such a propulsion unit.

According to another aspect, an object of the invention is a method for placing the half-assemblies of the above-described thrust reverser in the flight configuration.

This method comprises a step of inserting said tenon into said groove.

Preferably, the method comprises, after the insertion step, a locking step in which the half-assemblies are connected to each other by said locks.

Other advantages and features of the invention will appear upon reading the detailed, non-limiting description that follows.

BRIEF DESCRIPTION OF THE DRAWINGS

The following detailed description refers to the appended drawings wherein.

DETAILED DESCRIPTION OF SOME EMBODIMENTS

The figures comprise a relative reference frame X1, X2 and X3 respectively defining longitudinal (or axial), vertical and lateral directions orthogonal to each other.

Figure 1:
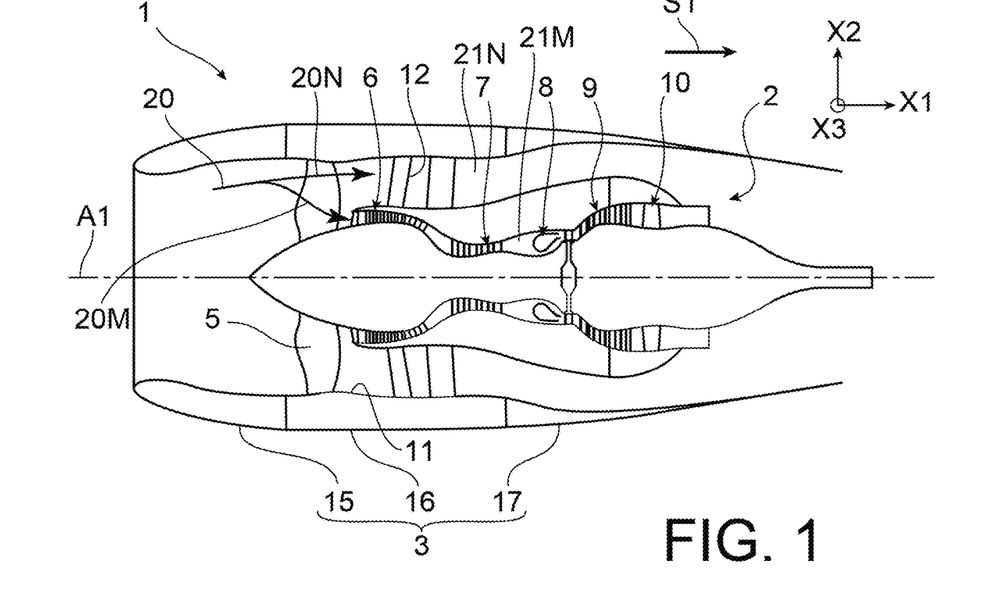
FIG. 1 is a schematic longitudinal sectional view of an aircraft propulsion unit comprising a turbofan engine.
Figure 2:
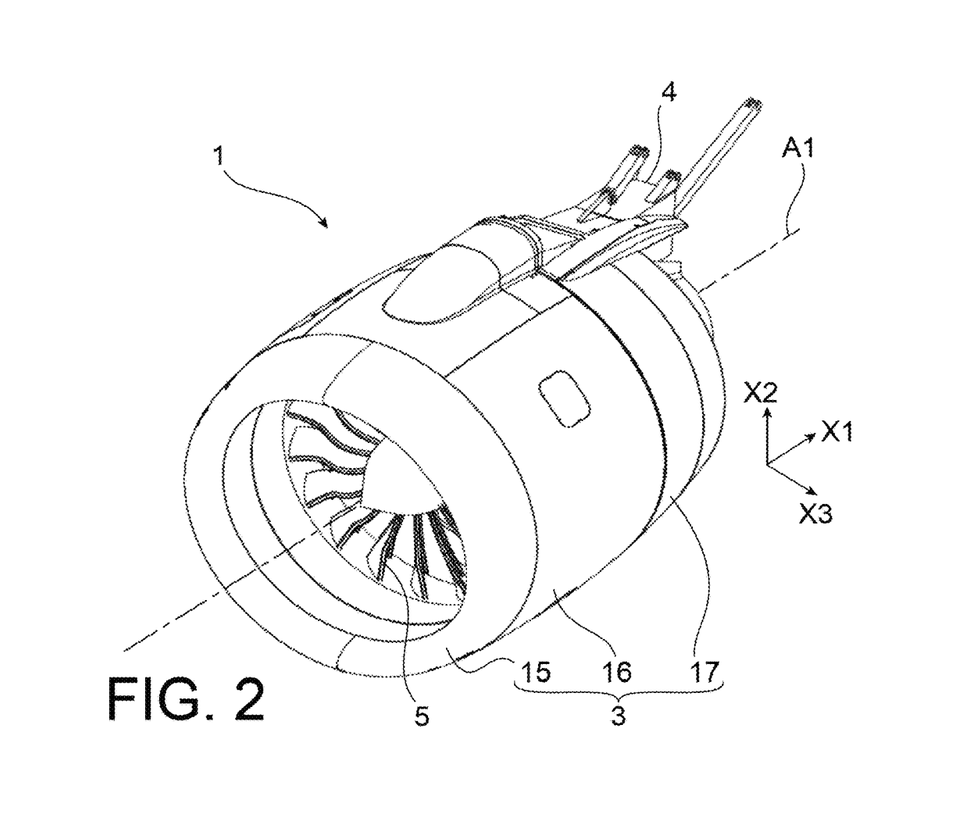
FIG. 2 is a schematic perspective view of the propulsion unit of FIG. 1.

FIGS. 1 and 2 show a propulsion unit 1 having a longitudinal central axis A1.

Next, the terms "upstream", "downstream", "front" and "rear" are defined with respect to a direction S1 of gas flow through the propulsion unit 1 along the longitudinal central axis A1.

The propulsion unit 1 comprises a turbine engine 2 (visible in FIG. 1), a nacelle 3 and a mast 4 (visible in FIG. 2) allowing connecting the propulsion unit 1 to a wing of an aircraft (not represented).

In the example of FIG. 1, the turbine engine 2 is a turbofan engine comprising, from upstream to downstream, a fan 5, a low-pressure compressor 6, a high-pressure compressor 7, a combustion chamber 8, a high-pressure turbine 9 and a low-pressure turbine 10. The compressors 6 and 7, the combustion chamber 8 and the turbines 9 and 10 form a gas generator.

The turbojet engine 2 comprises a fan casing 11 connected to the gas generator by structural arms 12.

The nacelle 3 comprises an upstream section 15 forming an air inlet, a middle section 16 which includes fan cowls enveloping the fan casing 11 and a downstream section 17 forming downstream of the propulsion unit 1 an outlet for discharging the gases generated by the turbojet engine 2.

In a manner known per se, during operation of the turbojet engine 2, an air flow 20 enters the propulsion unit 1 through the air inlet 15, passes through the fan 5 and then splits into a central primary flow 20M and a secondary flow 20N. The primary flow 20M flows in a primary gas circulation duct 21M within the gas generator. In turn, the secondary flow 20N flows in a secondary duct 21N surrounding the gas generator and delimited radially outwards by the fan casing 11 and by the downstream section 17 of the nacelle 3.

Figure 3:
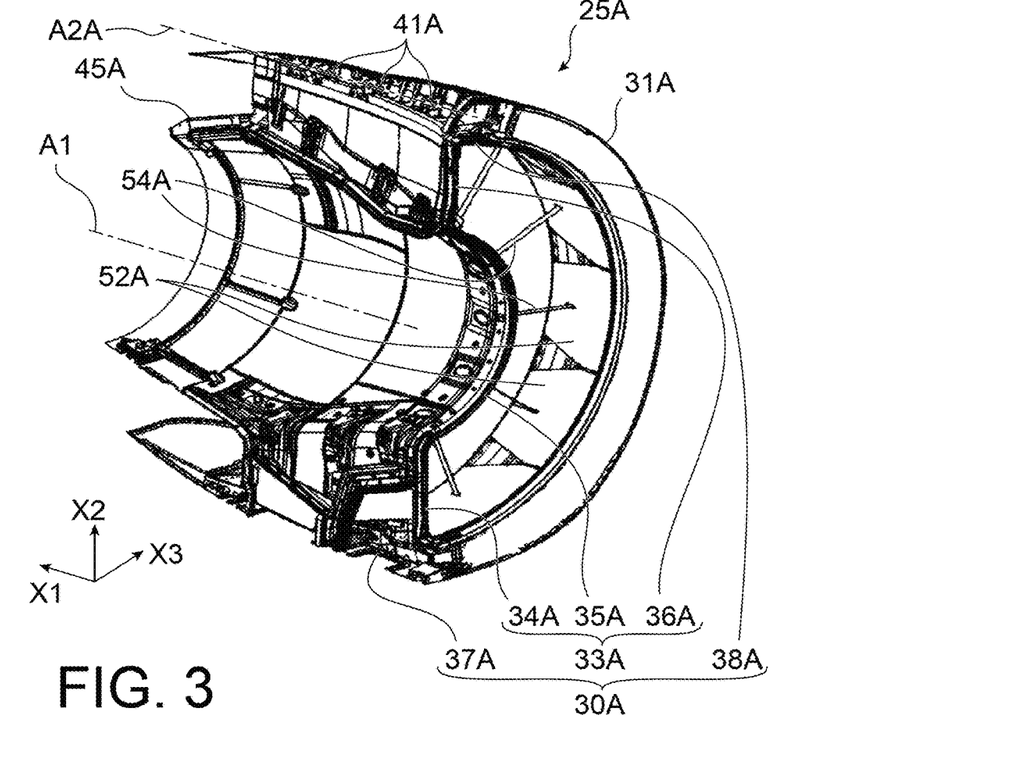
FIG. 3 is a schematic perspective view of a half-assembly of a thrust reverser with a D-like structure.
Figure 4:
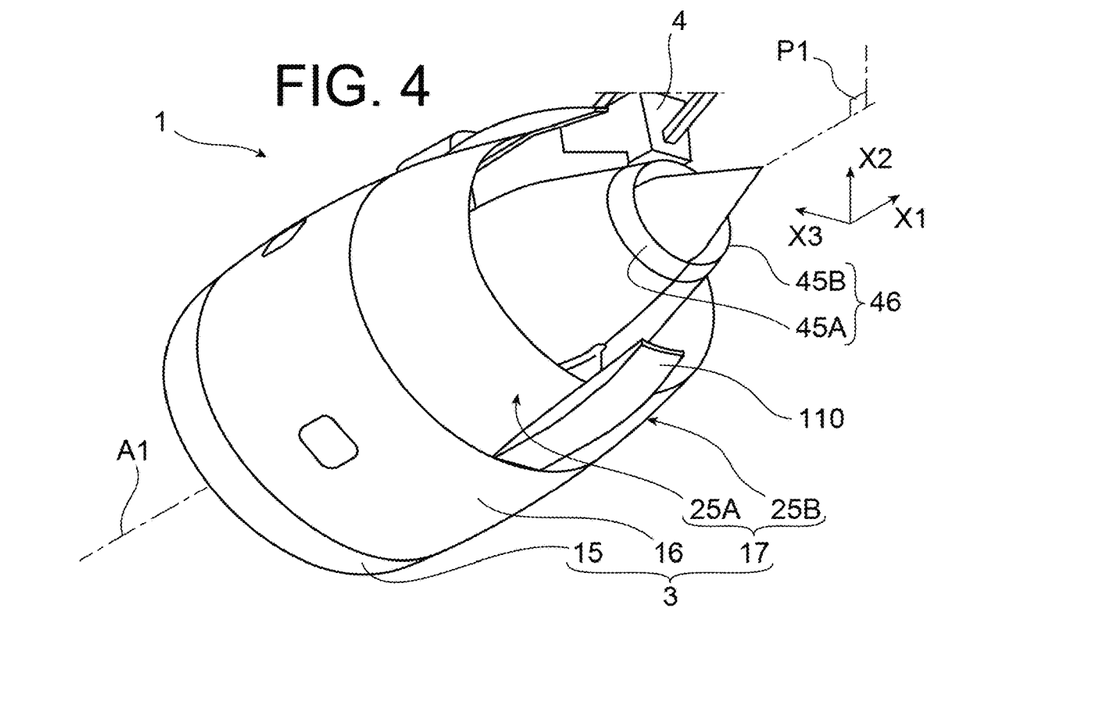
FIG. 4 is a schematic perspective view of the propulsion unit of FIG. 1.

FIGS. 3 and 4 show the downstream section 17 of the nacelle 3 in more details.

Referring to FIG. 4, the downstream section 17 comprises two half-assemblies 25A and 25B with a semi-cylindrical shape and symmetrical relative to each other relative to a longitudinal midplane P1 passing through the longitudinal central axis A1 and parallel to the vertical direction X2. Thus, the half-assemblies 25A and 25B extend laterally on either side of the plane P1 and in particular on either side of the mast 4.

In the following description and in some figures, references are used allowing distinguishing between elements located on one side of the plane P1 and symmetrical elements located on the other side of this plane. This distinction is made by adding to these references the suffix "A" for the elements located on one side of the plane P1 and the suffix "B" for those located on the other side. In general, all symmetrical elements are not represented in all figures. Furthermore, when a portion of the propulsion unit 1 has two half-portions symmetrical relative to the plane P1, the following description details in most cases only one of these half-portions. Unless stated otherwise, this description applies by analogy to the other corresponding half-portion.

In particular, the half-assembly 25A is described hereinafter with reference to FIG. 3. Hence, the following description relating to the half-assembly 25A applies by analogy to the half-assembly 25B.

The half-assembly 25A comprises two portions which are movable relative to each other. One of these portions forms a structure 30A herein called "fixed structure" which, in the flight configuration, remains in the same position with respect to the mast 4. The other portion of the half-assembly 25A forms a cowl 31A that is movable relative to the fixed structure 30A (cf. further below).

The fixed structure 30A comprises on the one hand an inner fairing 33A delimiting radially inwards a circumferential sector of a longitudinal portion of the secondary duct 21N.

The inner fairing 33A, commonly called "inner fixed structure", comprises, vertically from bottom to top in FIG. 3, a lower junction wall 34A also called "six-o'clock" "island" or "bifurcation", a semi-annular shaped central wall 35A and an upper junction wall 36A also called "twelve-o'clock" "island" or "bifurcation".

Besides, the fixed structure 30A comprises a lower beam 37A secured to a radial end of the lower junction wall 34A and an upper beam 38A secured to a radial end of the upper junction wall 36A.

The upper beam 38A comprises a first connecting element 41A allowing connecting the half-assembly 25A to the propulsion unit 1.

In this example, the first connecting element 41A comprises eyelets configured to cooperate with shafts (not represented) connected to a beam (not represented) secured to the mast 4 so as to enable a movement of the half-assembly 25A in rotation around an axis of rotation A2A passing through a centre of the eyelets 41A.

Figure 5:
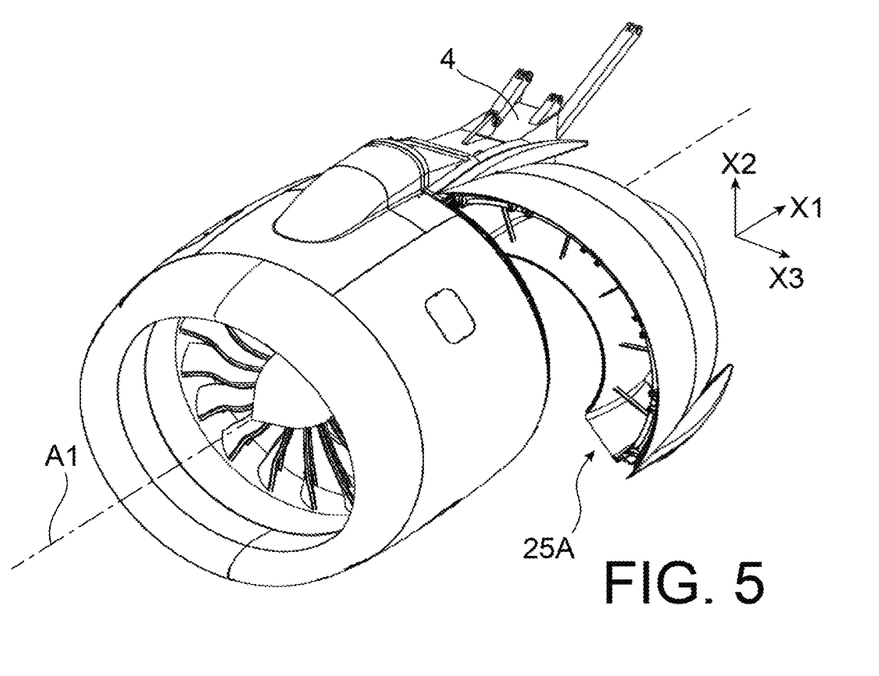
FIG. 5 is a schematic perspective view of the propulsion unit of FIG. 1, in the maintenance configuration.

Thus, the first connecting element 41A allows moving the half-assembly 25A between said flight configuration, illustrated in FIG. 4, and a maintenance configuration illustrated in FIG. 5.

In this example, the axis of rotation A2A is substantially parallel to the longitudinal central axis A1. In general, the axes A1 and A2A can form an angle comprised between 0° and 3°

As regards the movable cowl 31A, the latter extends radially outwards from the central wall 35A of the fixed structure 30A and has a semi-annular shape too.

Thus, the central wall 35A of the fixed structure 30A and the movable cowl 31A define radially therebetween said circumferential sector of the longitudinal portion of the secondary duct 21N, this sector extending circumferentially around the longitudinal central axis A1 between the lower junction wall 34A and the upper junction wall 36A of the fairing 33A.

In this example, the fixed structure 30A comprises a wall 45A connected to the central wall 35A and extending behind the latter so as to form a half-portion of an exhaust nozzle 46 visible in FIG. 4.

In a manner known per se, the movable cowl 31A is connected to the lower beam 37A and to the upper beam 38A of the fixed structure 30A according to a sliding connection.

In this example, this connection is made by slides (not represented) secured to the lower 37A and upper 38A beams and by rails (not represented) secured to the movable cowl 31A which cooperate with these slides.

Figure 10:
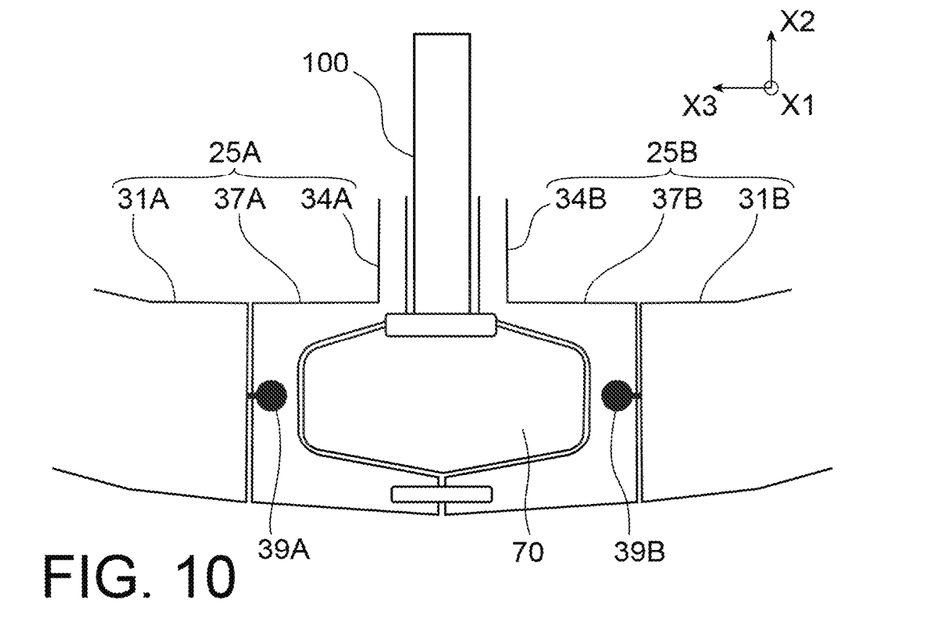
FIG. 10 is a schematic view of a portion of the half-assemblies and of the connecting beam of FIG. 8, in the flight configuration.

FIG. 10 schematically illustrates the sliding connection 39A between the movable cowl 31A and the lower beam 37A.

Figure 6:
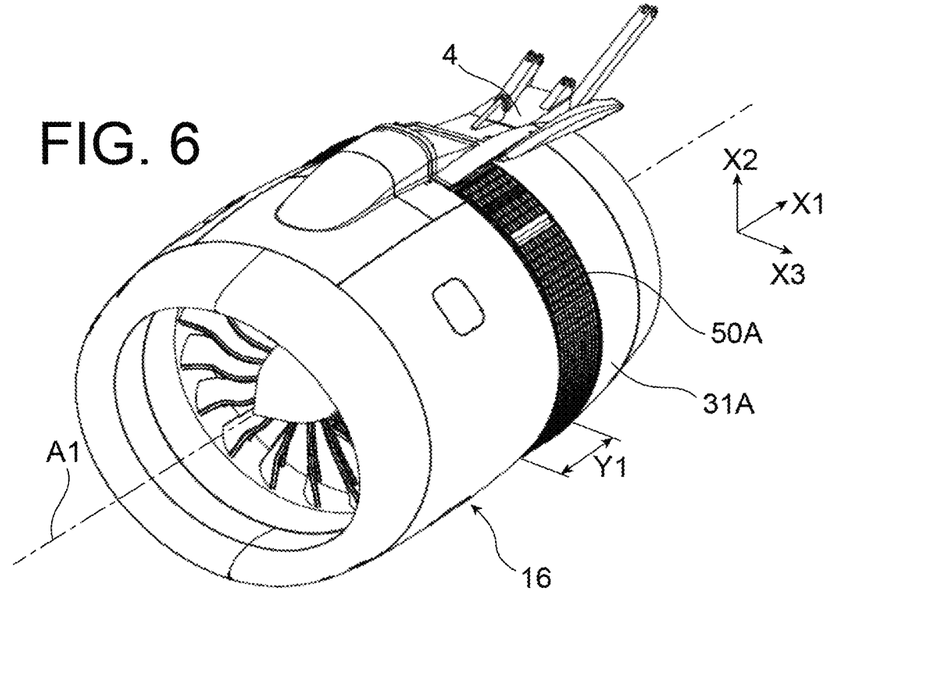
FIG. 6 is a schematic perspective view of the propulsion unit of FIG. 1, in the reverse thrust configuration.

Such a sliding connection enables the movable cowl 31A to be moved, for example using cylinders (not represented), relative to the fixed structure 30A in translation according to the longitudinal central axis A1 between an extended position, illustrated in FIGS. 1, 2 and 4, and a retracted position, illustrated in FIG. 6.

In the extended position, a front end of the movable cowl 31A is flush with a rear end of the fan cowl located on the same side of the plane P1 as the movable cowl 31A, so as to reduce the discontinuity between these cowls and thus reduce aerodynamic disturbances outside the nacelle 3.

In the retracted position, the front end of the movable cowl 31A and the rear end of the corresponding fan cowl of the middle section 16 are separated from each other by a distance Y1 defining a space forming a radial opening (cf. FIG. 6).

In this example, the nacelle 3 comprises cascades 50A and 50B extending respectively on one side and on the other of the plane P1.

The cascades 50A extend through the aforementioned radial opening when the movable cowl 31A is in the retracted position.

Moreover, referring to FIG. 3, the half-assembly 25A comprises flaps 52A and connecting rods 54A.

In a manner known per se, each of the flaps 52A is hinged on the movable cowl 31A and each of the connecting rods 54A is connected on the one hand to a respective one of the flaps 52A and on the other hand to the central wall 35A of the fairing 33A of the fixed structure 30A so that, when the movable cowl 31A switches from the extended position to the retracted position, the flaps 52A deploy radially in the secondary duct 21N so as to seal this duct 21N.

Thus, the downstream section 17 of the nacelle 3 forms a thrust reverser.

When the movable cowl 31A and 31B of each of the half-assemblies 25A and 25B is in the extended position, also called "direct thrust position", the secondary flow 20N is routed to the rear of the propulsion unit 1 throughout the longitudinal portion of the secondary duct 21N defined by the downstream section 17. In this direct thrust configuration, the flaps 52A of the half-assembly 25A as well as the flaps (not represented) of the half-assembly 25B are folded down against the inner wall of the corresponding movable cowl 31A or 31B. Thus, the secondary flow 20N contributes to thrust generation.

Figure 7:
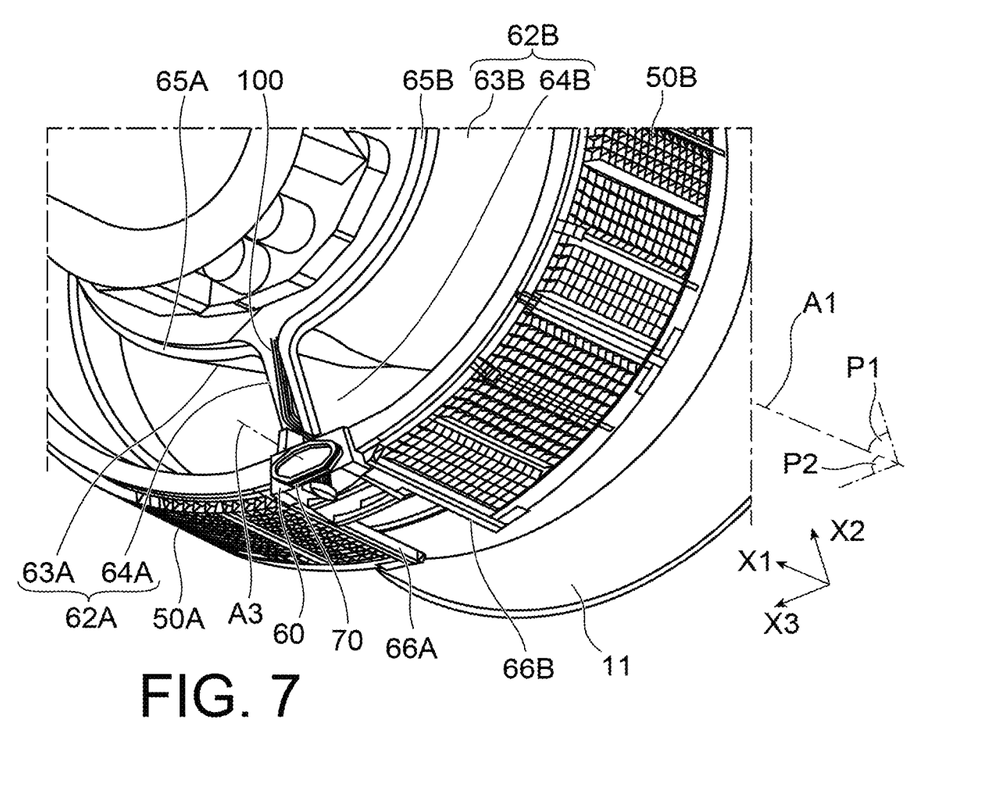
FIG. 7 is a schematic perspective view of a portion of the propulsion unit of FIG. 1, showing a mid-section fairing, cascades and a connecting beam.

When the movable cowl 31A and 31B of each of the half-assemblies 25A and 25B is in the retracted position, also called "thrust reversal position", the flaps 52A of the half-assembly 25A as well as the flaps of the half-assembly 25B seal the secondary duct 21N so as to redirect the secondary flow 20N towards said radial opening. Thus, the secondary flow 20N passes through the cascades 50A and 50B while being diverted thereby towards the front of the propulsion unit 1. Thus, the secondary flow 20N allows generating a counter-thrust. Referring to FIG. 7, the nacelle 3 comprises a connecting beam 60 extending along a longitudinal axis A3.

In this example, the axis A3 is parallel to the longitudinal central axis A1 of the propulsion unit 1 and passes through the longitudinal midplane P1.

With reference to a longitudinal midplane P2 perpendicular to the plane P1 and passing through the longitudinal central axis A1, the connecting beam 60 is located on one side of the plane P2, opposite the mast 4 which is located on the other side of this plane P2.

In other words, the connecting beam 60 is located at six o'clock whereas the mast 4 is located at twelve o'clock.

The connecting beam 60 is mounted on the middle section 16 so as to be secured to the fan casing 11.

The connecting beam 60 comprises a downstream portion extending cantilevered with respect to a rear end of the fan casing 11.

In the example of FIG. 7, the middle section 16 comprises, on either side of the longitudinal midplane P1, inner fairings 62A and 62B having a shape similar to the inner fairing 33A described hereinabove with reference to FIG. 3.

For each of the inner fairings 62A and 62B, FIG. 7 shows a portion of this inner fairing comprising a central wall 63A or 63B.

The inner fairings 62A and 62B are connected to the connecting beam 60 by the lower junction walls 64A and 64B, respectively.

Of course, each of the inner fairings 62A and 62B comprises an upper junction wall (not represented) enabling them to be connected to a fixed portion (not represented) of the propulsion unit 1.

Each of the inner fairings 62A and 62B carries a groove 65A or 65B configured to receive a portion of the inner fairing 33A or 33B of the half-assembly 25A or 25B in the flight configuration. The grooves 65A and 65B form an interface allowing ensuring aerodynamic continuity on the one hand between the inner fairings 62A and 33A and on the other hand between the inner fairing 62B and the inner fairing (not represented) of the half-assembly 25B.

In this example, the cascades 50A and 50B are movable in translation along the longitudinal central axis A1.

To this end, each of them is connected according to a sliding connection on the one hand at twelve o'clock to a fixed portion of the propulsion unit and on the other hand to the connecting beam 60.

In the embodiment of FIG. 7, slides 66A and 66B are fastened on the lateral portions of the connecting beam 60 and the cascades 50A and 50B carry rails (not visible in FIG. 7) which cooperate with the slides 66A and 66B.

In FIG. 7, the cascades 50A and 50B are in an extended position.

In this example, the cascades 50A and 50B are secured respectively to the movable cowl 31A of the half-assembly 25A and to the movable cowl of the half-assembly 25B, in translation along the longitudinal central axis A1 so that, when these movable cowls are in the direct thrust position, the cascades 50A and 50B are in the extended position and when the movable cowls are in the thrust reversal position the cascades 50A and 50B are in the retracted position.

In this example, when the half-assemblies 25A and 25B are in the flight configuration, the movable cowls cooperate with the cascades 50A and 50B through a tenon-and-groove connection similar to the connection between the connecting member 70 and said second connecting element of the half-assemblies 25A and 25B.

In the extended position, the cascades 50A and 50B are at least partially accommodated in a space extending radially between the fan casing 11 and a respective fan cowl of the middle section 16.

In the retracted position, the cascades 50A and 50B extend into the radial opening extending longitudinally between the movable cowls of the half-assemblies 25A and 25B and the fan cowls of the middle section 16 (cf. hereinabove and FIG. 6).

More specifically, the invention relates to the cooperation of the half-assemblies 25A and 25B with the connecting beam 60.

The portion of the connecting beam 60 visible in FIG. 7 has one end forming a connecting member 70 which cooperates with a second connecting element of the half-assemblies 25A and 25B when these are in the flight configuration.

Geometrically, the connecting member 70 extends:
between two transverse planes perpendicular to the longitudinal central axis A1,
between two longitudinal planes parallel to the longitudinal midplane P1 and extending on either side of the longitudinal axis A3,
between two longitudinal planes parallel to the longitudinal midplane P2 and extending on either side of the longitudinal axis A3.

Figure 8:
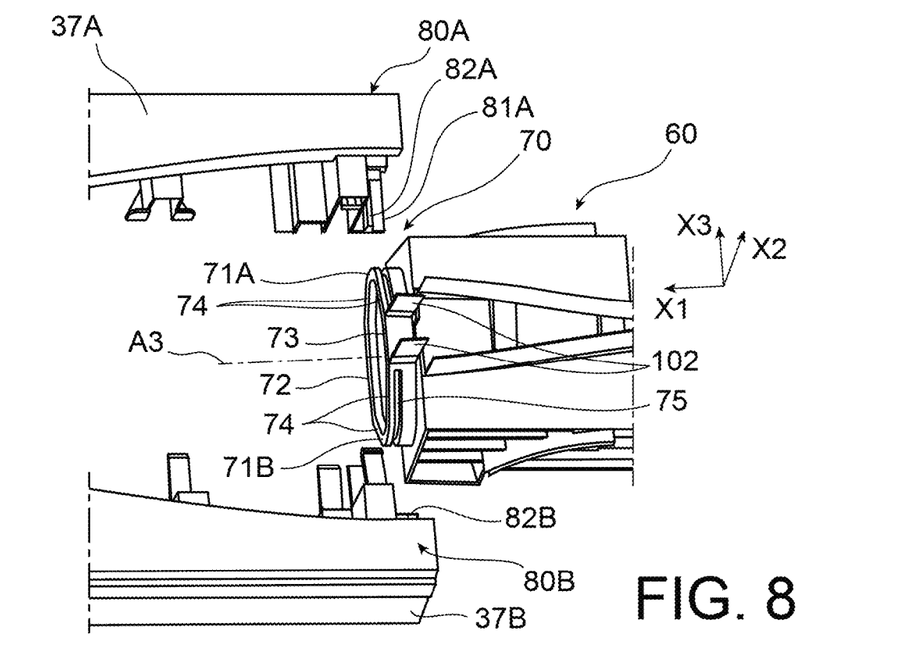
FIG. 8 is a schematic exploded perspective view of the connecting beam of FIG. 7 and of two lower beams belonging respectively to two thrust reverser half-assemblies.

Referring to FIG. 8, the connecting member 70 has two lateral vertices 71A and 71B, a lower base 72 and an upper base 73 configured so as to admit a longitudinal plane parallel to the plane P2 which passes through the longitudinal axis A3 and through the two lateral vertices 71A and 71B at the same time, and so that the plane P1 passes through the lower base 72 and through the upper base 73.

The connecting member 70 comprises four branches 74 respectively connecting the upper base 73 and the lateral vertex 71A to each other, the lateral vertex 71A and the lower base 72 to each other, the lower base 72 and the lateral vertex 71B to each other, and the lateral vertex 71B and the upper base 73 to each other.

The branches 74 are oblique with respect to the longitudinal midplanes P1 and P2.

The connecting member 70 is symmetrical relative to the plane P1.

On either side of the plane of symmetry P1, the connecting member 70 has a C-like shaped cross-section, the lower base 72 and the upper base 73 forming the free ends of the C.

The connecting member 70 comprises a groove 75 extending circumferentially around the axis A3.

In this example, the groove 75 is formed on the four branches 74, on the lateral vertices 71A and 71B and on the lower base 72 and forms a unique continuous groove.

FIG. 8 shows the lower beams 37A and 37B of the half-assemblies 25A and 25B respectively, as well as the connecting beam 60 in an exploded view.

The beam 37A of FIG. 8 comprises one end forming said second connecting element 80A of the half-assembly 25A.

The second connecting element 80A comprises a wall 81A having a shape complementary to the half-portion of the connecting member 70 extending on the same side of the plane P1 as the half-assembly 25A. Hence, the wall 81A also has a C-like shape.

Figure 9:
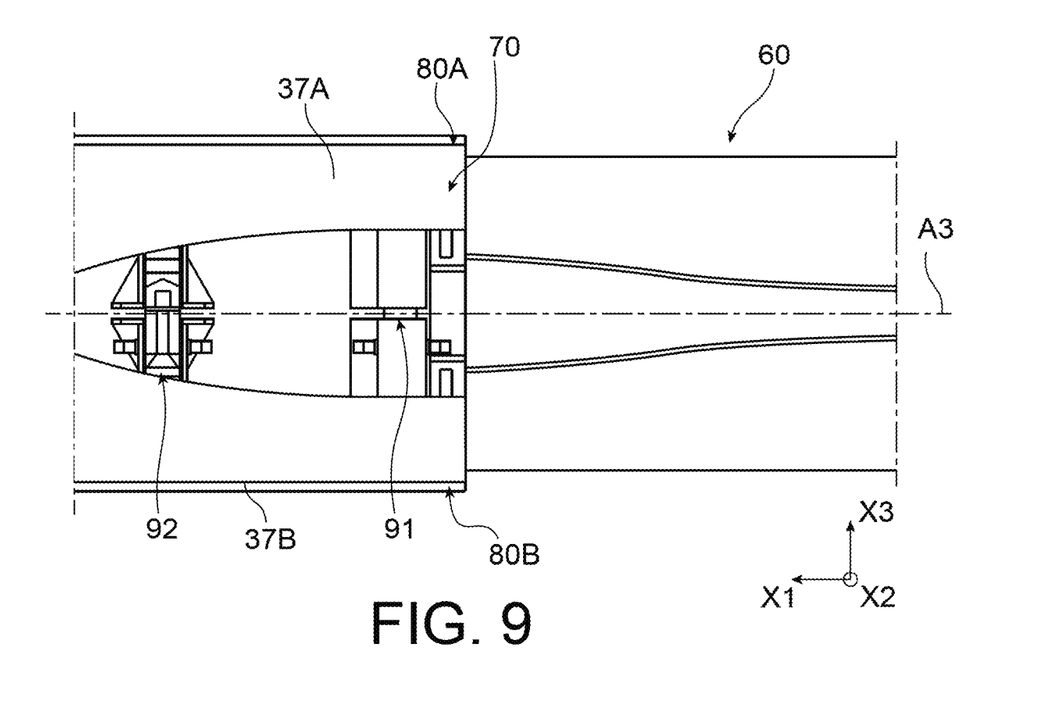
FIG. 9 is a schematic view of the beams of FIG. 8, in a flight configuration in which these beams are connected to each other.

The wall 81A forms a half-cavity configured to envelop this half-portion of the connecting member 70 when the half-assembly 25A is in the flight configuration, as illustrated in FIGS. 9 and 10.

The second connecting element 80A comprises a tenon 82A extending in this example over the wall 81A, within the half-cavity formed by this wall 81A.

The tenon 82A is configured to fit into the groove 75, more specifically into the half-portion of the groove 75 extending on the same side of the plane P1 as the half-assembly 25A, when the half-assembly 25A is moved from the maintenance configuration up to the flight configuration so as to position the fixed structure 30A of the half-assembly 25A with respect to the connecting member 70 and therefore with respect to the connecting beam 60.

In this example, the groove 75 has a trapezoidal shape. More specifically, it has a bottom surface and lateral surfaces which are oblique with respect to the bottom surface so that the width of the groove 75 is larger at the outer surface of the connecting member 70 onto which it opens than at the bottom surface.

The tenon 82A has a complementary shape and has a trapezium-shaped section.

Such a geometry of the tenon 82A and of the groove 75 allows increasing the accuracy of positioning as the half-assembly 25A approaches the flight configuration while facilitating the penetration of the tenon 82A into the groove 75 while taking into account in particular of clearances in the mechanism.

The previous description relating to the cooperation of the second connecting element 80A of the half-assembly 25A applies by analogy to the connecting element 80B of the half-assembly 25B.

It follows from the foregoing that, when the half-assemblies 25A and 25B are in the maintenance configuration, these are detached off the connecting member 70 and that, when the half-assemblies 25A and 25B are in the flight configuration, these are connected to each other via the connecting member 70 with which they cooperate so as to be properly positioned with respect to the beam 60.

In this example, locking of the half-assemblies 25A and 25B in the flight configuration is ensured by two locks 91 and 92.

Figure 11:
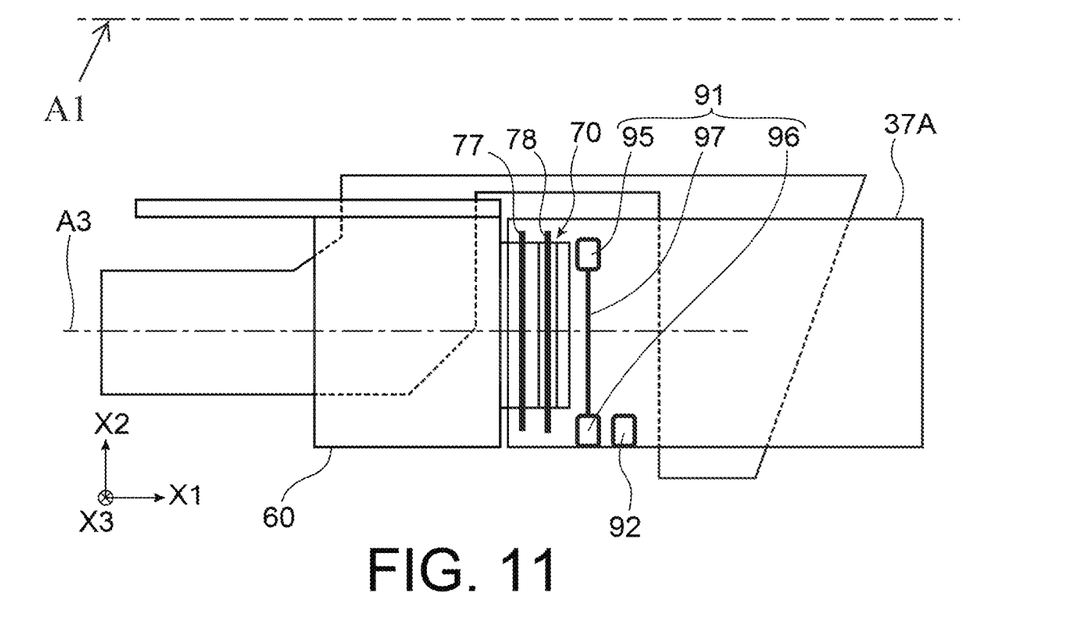
FIG. 11 is a schematic view of a portion of the half-assemblies and of the connecting beam of FIG. 8, in the flight configuration.

Referring to FIGS. 9 and 11, the locks 91 and 92 are mounted one behind the other downstream of the second connecting elements 80A and 80B, proximate to the connecting member 70.

Figure 12:
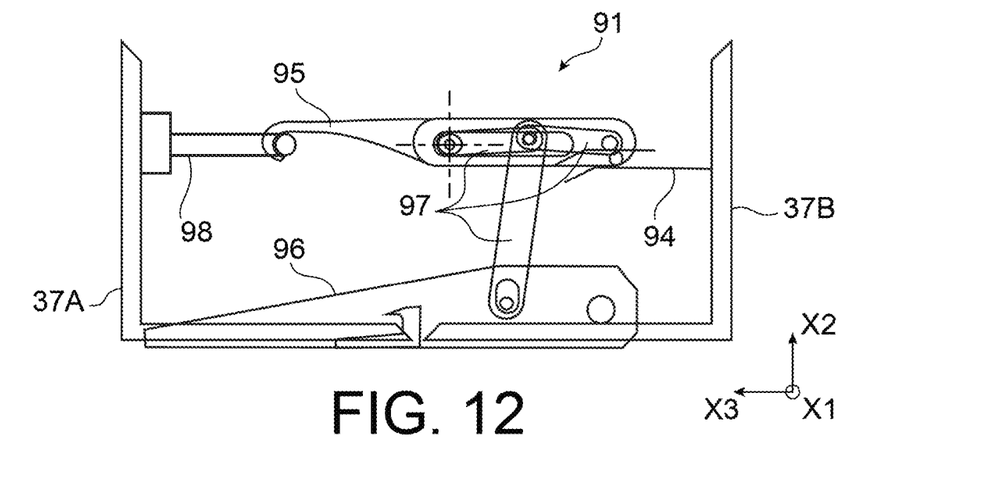
FIG. 12 is a schematic view of a lock according to a first embodiment, intended to lock the two half-assemblies of FIG. 8, the lock being in a locking position.
Figure 13:
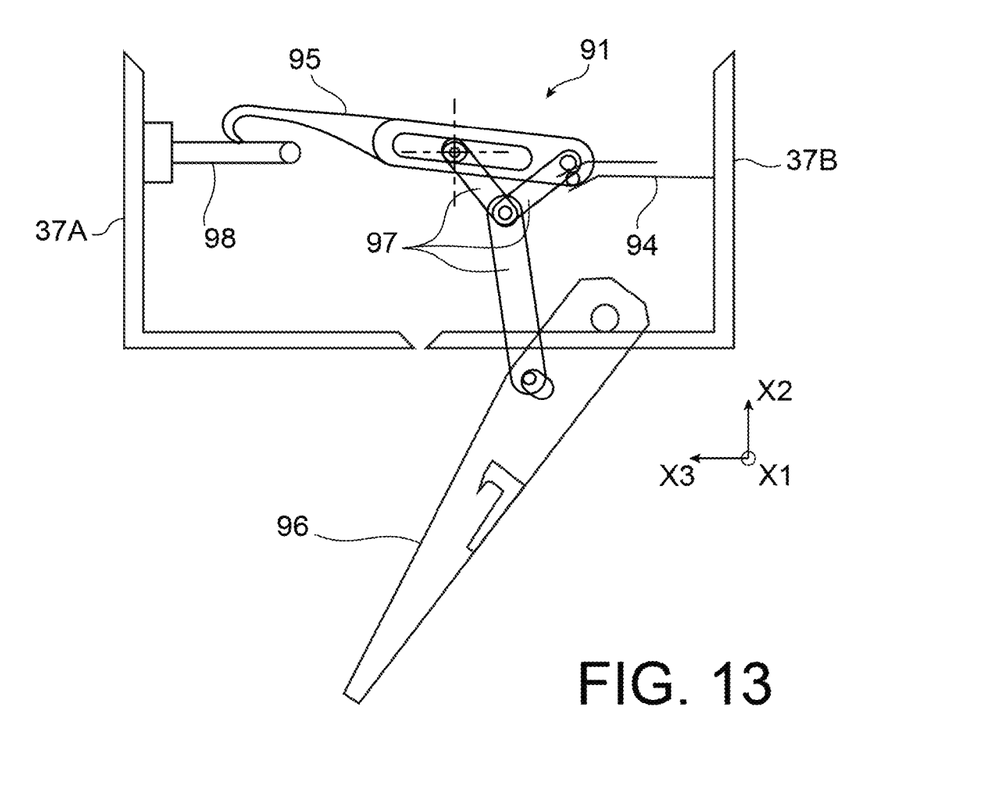
FIG. 13 is a schematic view of the lock of FIG. 12, the lock being in an unlocking position.

FIGS. 12 and 13 show the lock 91 respectively in a locking position and in an unlocking position.

In this example, the lock 91 comprises a hook 95, an actuating handle 96 and connecting rods 97 connecting the hook 95 and the handle 96 to each other.

The lock 91 is configured so that the handle 96 is flush with an outer surface of the lower beams 37A and 37B of the half-assemblies 25A and 25B when these are in the flight configuration and the lock 91 is in the locking position. This allows manually actuating the handle 96 while preventing it from projecting with respect to the outer surface of the lower beams 37A and 37B.

In this example, the lock 91 is mounted on the lower beam 37B of the half-assembly 25B. When the lock 91 is in the locking position, the hook 95 cooperates with a hooking element 98 secured to the lower beam 37A of the half-assembly 25A so as to exert on the lower beam 37A a tensile force tending to bring it closer to the lower beam 37B according to the lateral direction X3.

The movement of the lock 91 between the locking and unlocking positions is ensured by the connecting rods 97 and by a guide element 94 such as a cam secured to the lower beam 37B.

The lock 91 is called "inner lock" because the hook 95 is offset radially inwards with respect to the handle 96.

Indeed, the hook 95 and the hooking element 98 extend radially between the longitudinal central axis A1 of the propulsion unit 1 and the longitudinal axis A3 of the beam 60 (cf. FIG. 11).

In other words, in the locking position, the active portion of the inner lock 91 extends radially inwards with respect to the longitudinal axis A3, whereas the actuating portion of the inner lock 91 extends radially outwards with respect to the longitudinal axis A3.

Figure 14:
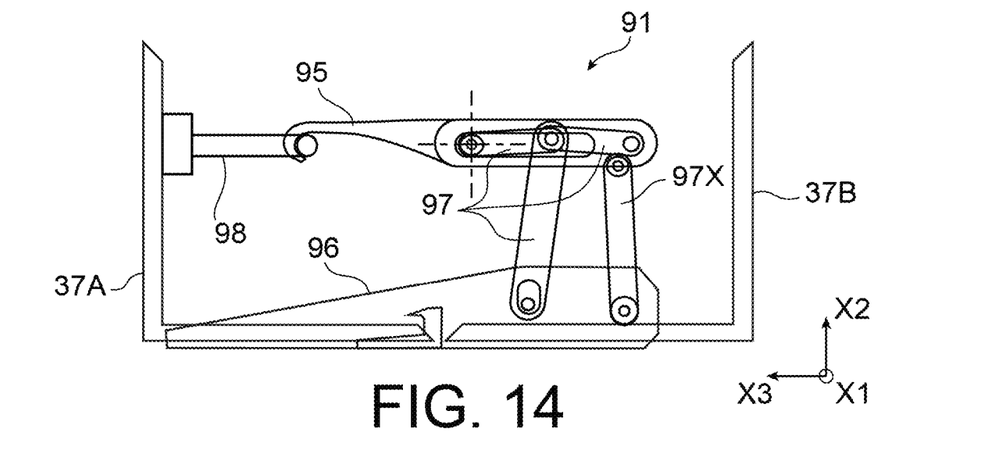
FIG. 14 is a schematic view of a lock according to a second embodiment, intended to lock the two half-assemblies of FIG. 8, the lock being in a locking position.
Figure 15:
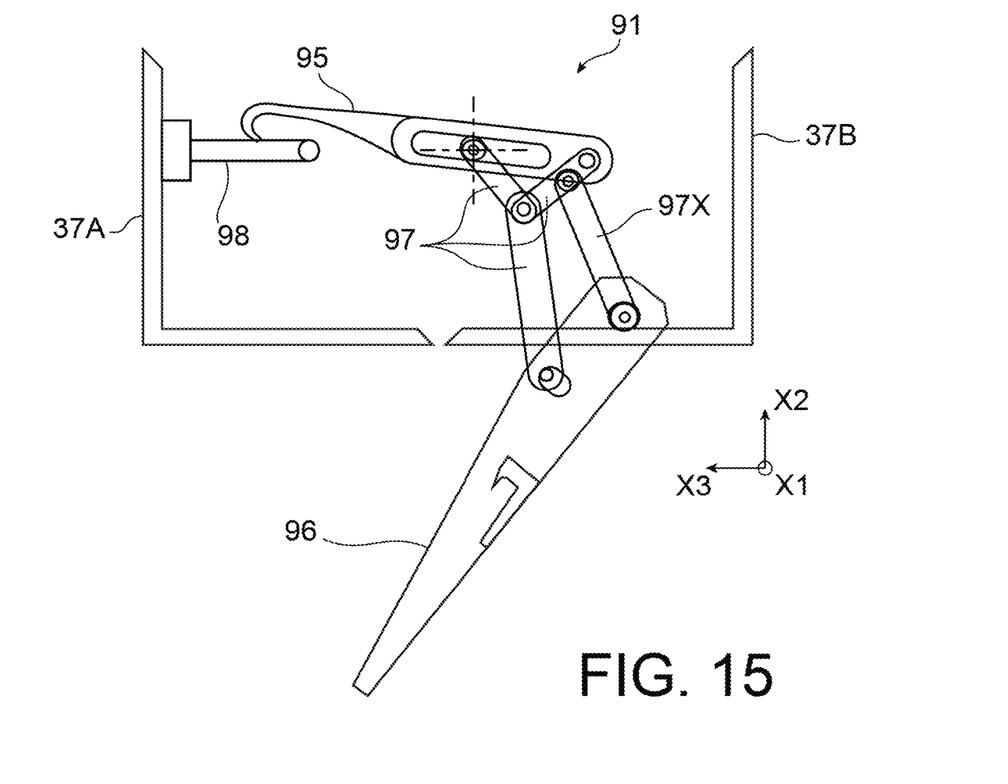
FIG. 15 is a schematic view of the lock of FIG. 14, the lock being in an unlocking position.

FIGS. 14 and 15 illustrate another embodiment wherein the inner lock 91 differs from that of FIGS. 12 and 13 in that it comprises an additional connecting rod 97X allowing dispensing with the guide element 94.

The lock 92, not represented in details, is a conventional lock which operates according to the same general principle as the inner lock 91.

Nonetheless, the active portion of the lock 92 is not offset radially inwards with respect to the longitudinal axis A3.

Consequently, in contrast with the inner lock 91, the lock 92 forms an "outer lock" to the extent that it extends and acts on a portion of the beams 37A and 37B located radially outwards with respect to the longitudinal axis A3.

Positioning and/or holding of the beams 37A and 37B in position with respect to the connecting member 70 and/or tightness can be improved by interposing one or more seal(s) between these different elements.

In the example of FIG. 11, a first seal 77 is accommodated in a groove (not represented) made in the connecting beam 60, upstream of the groove 75 and a second seal 78 is accommodated in the groove 75. The nacelle may comprise a sealing system formed by a series of seals including for example the seals 77 and 78 and/or other seals.

Referring to FIGS. 7, 8 and 10, the connecting beam 60 provides for a hollow inner space forming a passage for auxiliaries 100 of the turbojet engine 2.

A portion of this inner space is delimited by two partitions 102 extending in line with the upper base 73 of the connecting member 70 (cf. FIG. 8).

In the example of FIG. 4, the nacelle 3 comprises a box 110 accommodating the connecting beam 60 and the lower beams 37A and 37B of the half-assemblies 25A and 25B. Of course, the previous description is not restrictive. For example, the groove 75 may be discontinuous and/or have a rectangular geometry or any other shape. As another example, the second connecting element 80A and/or 80B may comprise instead of or complementarily with the tenon 82A or 82B one or more groove(s) (not represented) cooperating with one or more tenon(s) (not represented) secured to the connecting member 70.

What is claimed is:

1. A thrust reverser for an aircraft propulsion unit, comprising two half-assemblies, a connecting beam and cascades, each of the half-assemblies comprising a movable cowl and a fixed structure including a first connecting element and a second connecting element, the connecting beam comprising a connecting member, for each of the half-assemblies:

the first connecting element being configured to articulate the half-assembly on a fixed portion of the propulsion unit so as to be able to move the half-assembly between a flight configuration in which the second connecting element cooperates with the connecting member and a maintenance configuration in which the second connecting element is detached off the connecting member, in the flight configuration, the movable cowl being movable relative to the fixed structure in translation along a longitudinal central axis between a direct thrust position, in which the fixed structure and the movable cowl delimit radially therebetween a respective portion of a duct in order to channel a fluid flow towards a rear of the propulsion unit to generate thrust, and a thrust reversal position, in which the movable cowl uncovers a space receiving the cascades so that a portion of the fluid flowing in the duct could pass through the cascades while being diverted thereby so as to generate counter-thrust, wherein, amongst the connecting member and the second connecting element of each of the half-assemblies, one comprises a groove and the other one comprises a tenon configured to fit into the groove to achieve an embedding when the half-assemblies are moved from the maintenance configuration to the flight configuration so as to position each of the half-assemblies in the flight configuration, wherein the tenon or groove of said connecting member is a continuous tenon or groove in the connecting member which connects to each of the tenons or grooves of the second connecting elements, the thrust reverser comprising a lock configured to connect together and to lock the half-assemblies in the flight configuration.

2. The thrust reverser according to claim 1, wherein the second connecting element of each of the half-assemblies forms a half-cavity enveloping a respective half-portion of the connecting member when the half-assemblies are in the flight configuration.

3. The thrust reverser according to claim 1, wherein the connecting beam extends along an axis around which the groove extends.

4. The thrust reverser according to claim 1, comprising a second lock, wherein one of said lock or said second lock is an inner lock and another one of said lock or said second lock is an outer lock:

the inner lock being connected to the fixed structure of one of the half-assemblies and being configured to cooperate with a first hooking element secured to the fixed structure of the other half-assembly, the hooking element being positioned between the longitudinal central axis and an axis along which the connecting beam extends, the outer lock being connected to the fixed structure of one of the half-assemblies and being configured to cooperate with a second hooking element secured to the fixed structure of the other half-assembly, the axis along which the connecting beam extends being positioned between the second hooking element and the longitudinal central axis.

5. The thrust reverser according to claim 1, wherein the first connecting element of each of the half-assemblies is located on one side of a longitudinal midplane passing through the longitudinal central axis and wherein the connecting beam is located on the other side of this longitudinal midplane.

6. A nacelle for an aircraft propulsion unit, comprising a thrust reverser according to claim 1.

7. A propulsion unit for an aircraft, comprising a nacelle according to claim 6.

8. The propulsion unit according to claim 7, comprising a fan casing, the connecting beam extending axially cantilevered with respect to the fan casing.

9. An aircraft comprising a propulsion unit according to claim 7.

* * * * *